(12) United States Patent
Jain et al.

(10) Patent No.: US 11,929,945 B2
(45) Date of Patent: Mar. 12, 2024

(54) MANAGING NETWORK TRAFFIC IN VIRTUAL SWITCHES BASED ON LOGICAL PORT IDENTIFIERS

(71) Applicant: Nicira, Inc., Palo Alto, CA (US)

(72) Inventors: Jayant Jain, Cupertino, CA (US);
Ganesan Chandrashekhar, Campbell, CA (US); Anirban Sengupta, Saratoga, CA (US); Pankaj Thakkar, Cupertino, CA (US); Alexander Tessmer, San Jose, CA (US)

(73) Assignee: Nicira, Inc., Palo Alto, CA (US)

( * ) Notice: Subject to any disclaimer, the term of this patent is extended or adjusted under 35 U.S.C. 154(b) by 0 days.

(21) Appl. No.: 17/875,863

(22) Filed: Jul. 28, 2022

(65) Prior Publication Data
US 2022/0368654 A1 Nov. 17, 2022

Related U.S. Application Data

(63) Continuation of application No. 15/406,249, filed on Jan. 13, 2017, now Pat. No. 11,405,335.

(51) Int. Cl.
*H04L 49/00* (2022.01)
*H04L 12/46* (2006.01)
*H04L 41/0803* (2022.01)
*H04L 45/00* (2022.01)
*H04L 45/64* (2022.01)

(52) U.S. Cl.
CPC .......... *H04L 49/70* (2013.01); *H04L 12/4633* (2013.01); *H04L 41/0803* (2013.01); *H04L 45/34* (2013.01); *H04L 45/64* (2013.01); *H04L 49/30* (2013.01); *H04L 45/38* (2013.01)

(58) Field of Classification Search
None
See application file for complete search history.

(56) References Cited

U.S. PATENT DOCUMENTS

| | | | |
|---|---|---|---|
| 2013/0044762 A1* | 2/2013 | Casado | H04L 41/122 370/401 |
| 2014/0304499 A1* | 10/2014 | Gopinath | H04L 63/168 713/151 |
| 2015/0117256 A1* | 4/2015 | Sabaa | H04L 45/68 370/254 |
| 2015/0124828 A1* | 5/2015 | Cj | H04L 12/4633 370/392 |
| 2015/0381484 A1* | 12/2015 | Hira | H04L 45/745 370/392 |
| 2016/0197824 A1* | 7/2016 | Lin | H04L 12/6418 370/389 |
| 2016/0380833 A1* | 12/2016 | Zhu | H04L 67/563 709/223 |

* cited by examiner

*Primary Examiner* — Steve R Young
(74) *Attorney, Agent, or Firm* — Quarles & Brady LLP (57) ABSTRACT

Described herein are systems, methods, and software to enhance network traffic management. In one implementation, a first host identifies a packet to be transferred from a first virtual machine on the first host to a second virtual machine on a second host. In response to identifying the packet, the first host identifies a source logical port for the first virtual machine, and transferring a communication to the second host, wherein the communication encapsulates the data packet and the source logical port. Once the packet is received by the second host, the second host may use the source logical port to determine a forwarding action for the packet.

20 Claims, 8 Drawing Sheets

| RULES 810 | SOURCES 812 | DESTINATIONS 814 | PROTOCOLS 816 | ACTIONS 818 |
|---|---|---|---|---|
| RULE A 840 | SOURCE | DESTINATION | PROTOCOL | ACTION |
| RULE B 841 | SOURCE | DESTINATION | PROTOCOL | ACTION |
| RULE C 842 | SOURCE | DESTINATION | PROTOCOL | ACTION |
| RULE D 843 | SOURCE | DESTINATION | PROTOCOL | ACTION |

DATA STRUCTURE 800

MANAGING NETWORK TRAFFIC IN VIRTUAL SWITCHES BASED ON LOGICAL PORT IDENTIFIERS

RELATED APPLICATIONS

This application is a continuation of U.S. application Ser. No. 15/406,249 entitled "MANAGING NETWORK TRAFFIC IN VIRTUAL SWITCHES BASED ON LOGICAL PORT IDENTIFIERS" filed Jan. 13, 2017, which is hereby incorporated by reference in its entirety.

BACKGROUND

In computing environments, virtual switches may be used that comprise software modules capable of providing a communication platform for one or more virtual nodes in the computing environment. These virtual switches may be used to intelligently direct communications on the network by inspecting packets before passing them to other nodes on the same network. For example, packets may be inspected to determine the source and destination internet protocol (IP) addresses to determine if the communication is permitted to be delivered to the destination computing node. In some implementations, virtual switches may be configured with forwarding rules or flow operations that indicate actions to be taken against a packet. These flow operations identify specific attributes, such as IP addresses, media access control (MAC) addresses, and the like, within the data packet and, when identified, provide a set of actions to be asserted against the data packet. These actions may include modifications to the data packet, forwarding rules for the data packet, amongst other possible operations.

To manage the virtual switches, a virtual switch controller may be provided that is used to separate the control plane from the data plane of a software defined network. These virtual switch controllers are used to define rules, or control mechanisms that direct a packet when it is received by the virtual switch. In some implementations, this routing may include defining which nodes are associated with which logical networks, which security mechanisms are placed on communicating packets, or some other control mechanism with respect to the data plane of the virtual switch. However, although virtual switches and their associated controllers provide a valuable mechanism for routing packets for virtual machines, difficulties can arise when logical identifiers for virtual machines are required to be translated into IP and MAC addresses to implement desired forwarding rules.

Overview

The technology disclosed herein enhances network traffic management for software defined networks. In one implementation, a method of operating a virtual computing environment to provide packet enforcement using logical ports includes, in each of a first host computing system and second host computing system, maintaining a data plane forwarding configuration based on forwarding rules and logical port status information for virtual machines in the virtual computing environment. The method further provides, in the first host computing system, identifying a packet to be transferred from a virtual machine executing on the first host computing system to a virtual machine executing on the second host computing system, and identifying a source logical port associated with the virtual machine on the first host computing system. Once identified, the method provides, in the first host computing system, transferring a communication to the second host computing system, wherein the communication encapsulates at least the packet and the source logical port. The method further provides, in the second host computing system, receiving the communication and determining a forwarding action for the packet in the communication based at least on the source logical port and the data plane forwarding configuration.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The various examples disclosed herein provide enhancements for managing packet forwarding over virtual switches. In particular, virtual switches are configured with forwarding rules that indicate actions to be taken against packets as they are passed through the virtual switch. These forwarding rules may each define attributes, such as source and destination internet protocol (IP) addresses, source and destination media access control (MAC) addresses, protocols, and other similar attributes, and further define a set of forwarding actions to be asserted against data packets that meet the defined attributes. These forwarding actions may include affirmative forwarding actions to forward the packet toward its destination, modification actions to modify the packet, blocking actions for the packet, or other similar actions to be taken against a packet. For example, as a packet is received at a virtual switch, the packet may be inspected by the virtual switch to determine a forwarding action that should be applied to the packet. Once a action is identified, the action may be taken, which may include forwarding the packet to a destination virtual machine or system, blocking the packet, modifying the packet, or some other similar operation.

In the present example, to inspect the packets that are transferred over the virtual switches, the virtual switches may employ rule based enforcement based on logical ports that are associated with each of the virtual machines of the network. These virtual ports comprise logical values that are used as identifiers specific to the logical network links of each the virtual machines. For example, a first virtual machine of the network would be associated with a first logical port value, while a second virtual machine would be associated with a second logical port value. Accordingly, rather than translating a logical port of the virtual machine into a IP or MAC address to determine the appropriate forwarding rule, a virtual switch may determine the source and destination logical ports of a communication to determine a forwarding action for the communication based on the logical ports.

To provide this operation using the logical ports, when communications are transferred over the physical network or over a virtual router located on the same host, the source logical port must be identified or defined within the communications. For example, if a first virtual machine on a first host computing system were to transfer a data packet to a second virtual machine on a second host computing system, the virtual switch on the first host computing system may be required to identify a source logical port. This source logical port may comprise a value that is used as an identifier specific to the logical network link of the virtual machine. Once the source logical port is identified, the logical port may be injected into a communication protocol header for a tunneling communication that encapsulates the data packet from the first virtual machine. The encapsulated communication can then be transferred to the second host for processing based at least in part on the encapsulated source logical port for the communication.

Figure 1:
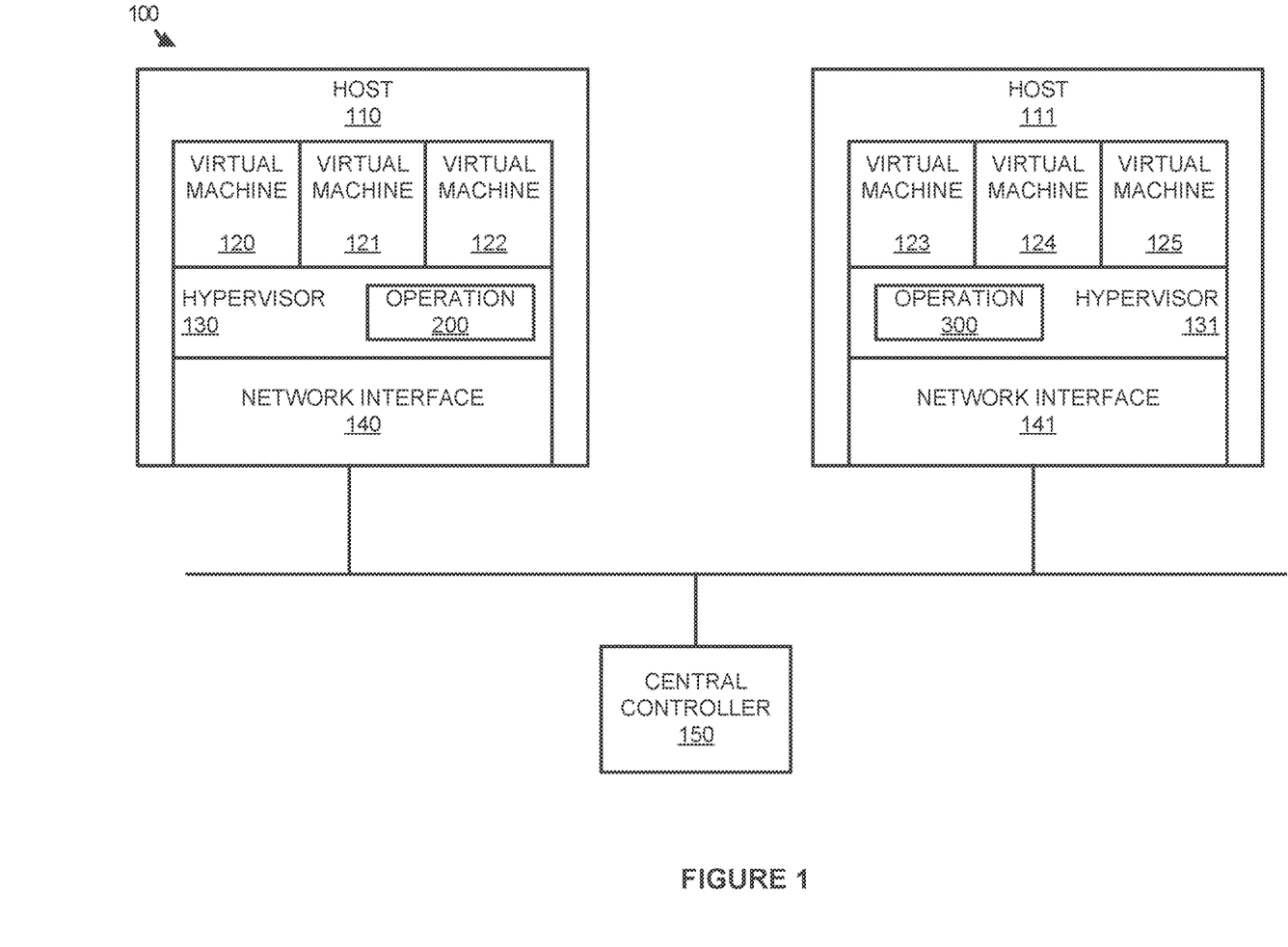
FIG. 1 illustrates a virtual computing environment to manage packet forwarding based on port identifiers according to an implementation.

FIG. 1 illustrates a virtual computing environment 100 to manage packet forwarding based on port identifiers according to an implementation. Virtual computing environment 100 includes hosts 110-111 with virtual machines 120-125, hypervisors 130-131, and network interfaces 140-141. Virtual computing environment 100 further includes central controller 150, which may be used to manage and provide control plane information for virtual switches located on hosts 110-111.

In operation, hosts 110-111 execute hypervisors 130-131, respectively, to provide a platform for virtual machines 120-125. Hypervisors 130-131 abstract the physical components of hosts 110-111 and provide virtual representations of hardware to the virtual machines, including processing systems, storage interfaces, network interfaces, or some other abstracted components. In addition to providing the abstracted hardware for the operations of virtual machines 120-125, hypervisors 130-131 may be used to provide software defined networks (SDNs) to the virtual machines. These SDNs, which may include virtual switches and routers, are used to provide connectivity between virtual machines and computing nodes that may exist on the same host computing system, or may operate on separate host computing systems.

To provide the SDNs, forwarding rules, sometimes referred to as flow rules or flow tables, may be provided from central controller 150 or may be provided locally at hosts 110-111. These forwarding rules define actions to be taken on packets based on attributes of the packet, such as the source of the packet, the destination of the packet, the protocol used in the packet, or any other similar attribute for a particular packet. As an example, a forwarding rule may provide that a first service group, such as an application service group, is permitted to communicate with a database service group using a defined protocol. As a result, when packets are identified from the application service group to be transferred to the database service group using the defined protocol, the communication may be forwarded to the destination virtual machine because the communication is permitted.

In the present example, to identify the source and destination of packets and enforce the forwarding rules, hypervisors 130-131 may identify source and destination logical ports associated with the packets. Accordingly, when a packet is transferred between two virtual machines, either locally on the same host of hosts 110-111 or across hosts 110-111, source and destination logical ports may be identified for the communication and compared to the rules to determine whether the communication is to be permitted. To allow the destination virtual switch to determine the source virtual port, the hypervisor on a first host may be required to encode the source port in a header of tunneling communication to a second host. For example, in a communication of a data packet between virtual machine 120 and virtual machine 123, hypervisor 130 may be required to identify the source logical port for the data packet, encode the source logical port in a tunneling communication with the data packet, and transfer the tunneling communication to host 111 with hypervisor 131. Once received, hypervisor 131 may extract the source port identifier from the tunneling communication and apply a forwarding action to the data packet based on the identified port.

Figure 2:
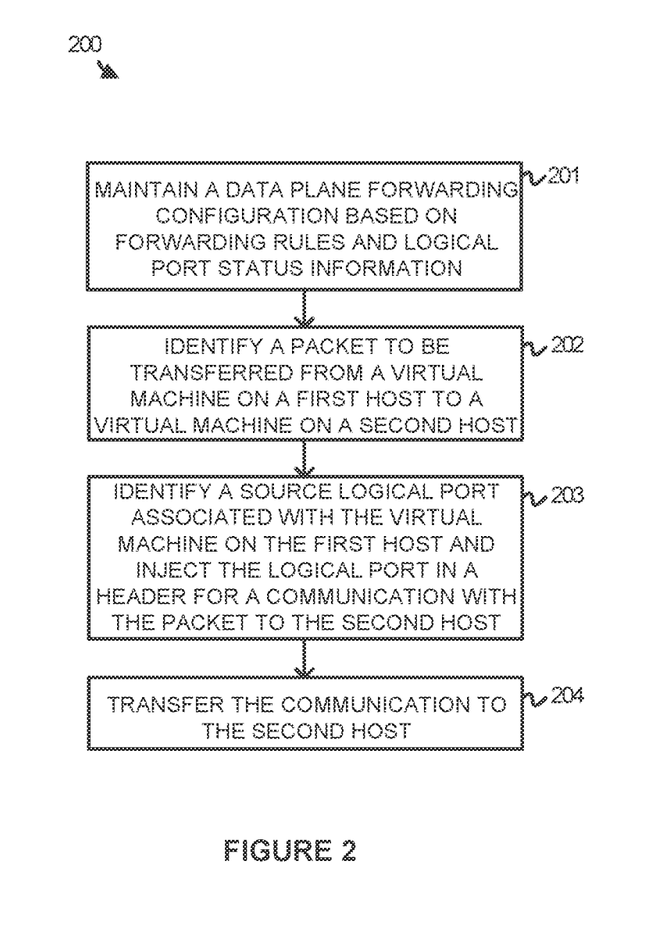
FIG. 2 illustrates an operation of a host to transfer a data packet for a virtual machine to a second host according to an implementation.
Figure 3:
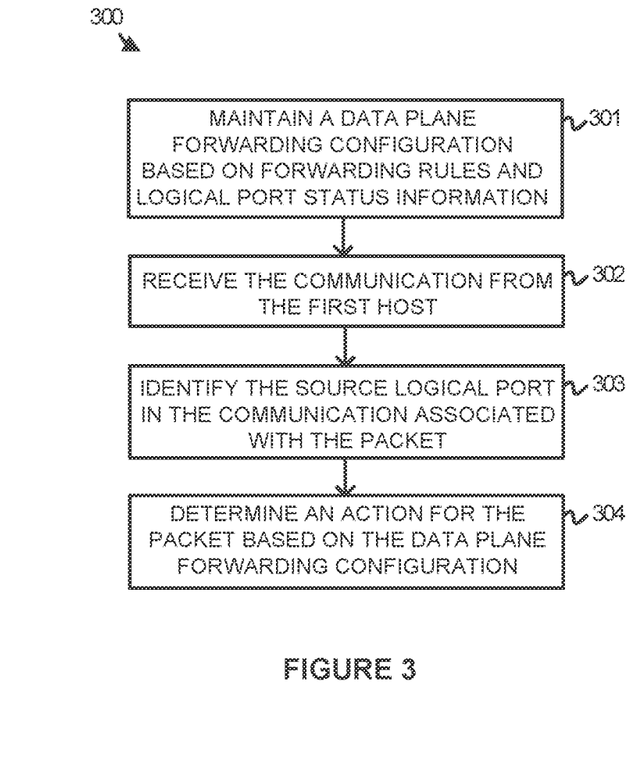
FIG. 3 illustrates an operation of a host to apply forwarding rules to a communication from a second host according to an implementation.

To further demonstrate the operations of transferring a packet between hosts, FIGS. 2 and 3 are provided. FIG. 2 illustrates an operation 200 of a host to transfer a data packet for a virtual machine to a second host according to an implementation. The processes of operation 200 are referenced parenthetically in the paragraphs that follow with reference to systems and elements of virtual computing environment 100 of FIG. 1.

As depicted, operation 200 includes maintaining (201) a data plane forwarding configuration for the virtual machines based on forwarding rules and logical port status information. In at least one implementation, hypervisor 130 may be responsible for implementing a SDN for virtual machines 120-122. To provide the SDN operations, including virtual switching and routing operations, hypervisor 130 may receive and implement forwarding rules. These forwarding rules may be supplied by central controller 150 or may be supplied locally at host 110. In many implementations, these forwarding rules may be generated using security group identifiers or virtual machine group identifiers. For example, a rule may specify that communications are permitted between application group virtual machines and database group virtual machines using one or more protocols. Consequently, when deployed in the SDN provided by hypervisor 130, hypervisor 130 may be required to identify logical port status information (such as logical port identifiers/values) for the virtual machines that correspond to each of the security groups. This logical port information corresponds to virtual machines local to host 110, as well as virtual machines that execute on other hosts within virtual computing environment 100. In some implementations, this logical port information may be exchanged by hosts 110-

111, and/or provided by central controller 150. Once the logical port information is identified, a data plane forwarding configuration may be implemented that associates forwarding actions (defined by the forwarding rules) with logical ports identified via the logical port status information.

While maintaining the data plane configuration for the virtual machines in virtual computing environment 100, operation 200 further includes identifying (202) a packet to be transferred from a virtual machine on host 110 to a virtual machine on second host 111. This packet may comprise a Transmission Control Protocol (TCP), a user datagram protocol packet (UDP) packet, or some other type of packet for communication out of a virtual machine. In response to identifying the packet, host 110 and hypervisor 130 will identify (203) a source logical port associated with the virtual machine on host 110, inject the source logical port in a header for a communication to host 111, wherein the communication may comprise a second packet that encapsulates the identified packet from the virtual machine and the source virtual port for the virtual machine. This second packet may comprise a tunneling protocol packet, such as a VXLAN packet, a Generic Network Virtualization Encapsulation (GENEVE) packet, or some other similar tunneling protocol packet. In some implementations, in encapsulating the packet from the virtual machine into a second communication packet, the logical port associated with the virtual machine may be added to the header of the second packet, while the packet from the virtual machine may be placed in the payload of the second packet. Once encapsulated in the second communication, the communication may be transferred (204) over physical network interface 140 to host 111.

As a demonstrative example, virtual machine 121 may transfer a packet to virtual machine 124. In response to transferring the packet, hypervisor 130 may identify the packet, determine a source logical port associated with virtual machine 121, and encapsulate the packet from virtual machine 121 in a second communication packet capable of transfer to host 111. This second packet may include the information from the first packet and may further include the source logical port of virtual machine 121, wherein the logical port may be used in forwarding the packet when it is received at host 111.

In some implementations, in addition to providing information to the second host 111 for the communication, hypervisor 130 may further implement forwarding rules locally for a transferred packet. In particular, hypervisor 130 may identify the source logical port and a destination logical port using the logical port status information for the corresponding virtual machines, and identify forwarding action based at least in part on the source and destination logical ports. Again, referring to an example of a packet to be transferred from virtual machine 121 to virtual machine 124, a source port would be identified for virtual machine 121 and a destination port would be identified for virtual machine 124. Once identified, a forwarding action may be determined that applies to the logical ports, and the forwarding action applied locally at host 110. Accordingly, if the packet were permitted to be transferred, then the packet may be forwarded using network interface 140 to host 111. However, if the packet were not permitted, the packet may be stopped prior to be transferred over the physical network.

FIG. 3 illustrates an operation of a host to apply forwarding rules to a communication from a second host according to an implementation. The processes of operation 300 are referenced parenthetically in the paragraphs that follow with reference to systems and elements of virtual computing environment 100 of FIG. 1.

As illustrated in FIG. 3, similar to the operations of host 110, host 111 maintains (301) a data plane forwarding configuration for the virtual machines based on forwarding rules and logical port status information. The forwarding rules may be defined locally at host 111 or may be transferred from central controller 150 in some implementations. These rules may define security groups, or groups of virtual machines, that require the same forwarding configuration. For example, all database classified virtual machines may be allocated to the same security group to ensure that all virtual machines providing the database operation are provided with the same forwarding rules. Accordingly, an administrator may dynamically add or remove virtual machines as required within the computing environment without generating new rules for the virtual computing environment. Additionally, because the virtual machines may be added or removed from the virtual computing environment, hypervisors 130-131 may exchange and/or be provided with logical port information (logical port identifiers associated with virtual machines) for virtual machines currently deployed in the environment. Based on the forwarding rules that may be provided in the form of virtual machine groups, and the logical port status information that identifies logical ports for the virtual machines in the groups, a data plane forwarding configuration may be defined that associates forwarding actions (forward, block, modify, etc.) with the logical ports allocated to the virtual machines.

As the forwarding configuration is maintained, host 111 may receive (302) the communication from first host 110, wherein the communication includes the packet from the virtual machine and the logical port associated with the virtual machine. In response to receiving the communication, host 111 may identify (304) the source logical port in the communication associated with the packet from the virtual machine, and determine (305) an action for the packet based on the logical port, the forwarding rules, and the logical port status information for the virtual computing environment 100.

As a demonstrative example, when a packet is received from network interface 141, hypervisor 131 may decapsulate the tunneling protocol packet to identify the original packet from the virtual machine and the logical port associated with the virtual machine. Once decapsulated, the logical port may be used in conjunction with the data plane forwarding configuration to determine how to forward the packet. For example, the source logical port may be used in conjunction with the destination logical port (which can be determined based on the logical port status) to determine a forwarding action for the packet.

Although illustrated in the present example as transferring a packet from host 110 to host 111, it should be understood that each of the hosts may be capable of providing similar transfer and receive operations. Further, while demonstrated in the example of FIGS. 1-3 as transferring the packet physically between hosts, it should be understood that similar operations may also be provided when a virtual router (or distributed virtual router) is deployed on a single host. Accordingly, when a packet is transferred over the virtual router on the same physical host, a source logical port associated with the source virtual machine may be placed in a header of a tunneling packet over the virtual router, wherein the tunneling packet includes at least the packet from the virtual machine and the logical port identifier associated with the source virtual machine. Once transferred over the virtual router, the virtual switch may identify the logical port identifier, and apply forwarding rules based at least on the logical port identifier.

Figure 4:
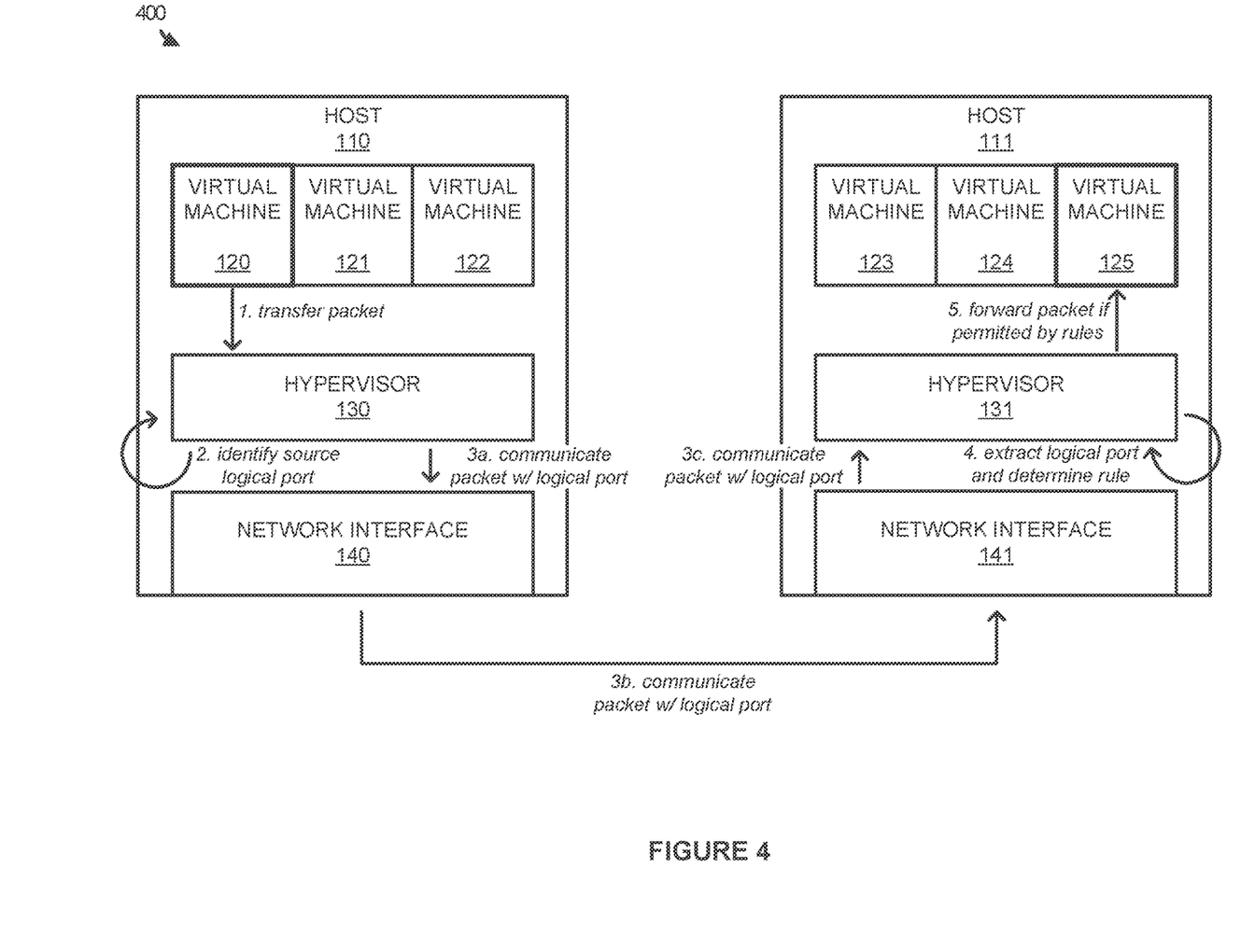
FIG. 4 illustrates an operational scenario of transferring a data packet from a first virtual machine to a second virtual machine according to an implementation.

FIG. 4 illustrates an operational scenario 400 of transferring a data packet from a first virtual machine to a second virtual machine according to an implementation. Operational scenario 400 includes systems and elements of virtual computing environment 100 of FIG. 1.

As depicted, virtual machine 120 transfers, at step 1, a packet to be forwarded to a destination virtual machine 125. In response to transferring the packet, hypervisor 130 identifies, at step 2, a source logical port associated with virtual machine 120. In particular, when virtual machines are deployed within a virtual network, the virtual machines may be assigned a logical port, which is used in joining the virtual machine to a corresponding logical network or logical switch. Once the source logical port is identified, hypervisor 130, at step 3a, encapsulates the packet from virtual machine 120 into a second communication packet, wherein the second communication packet includes the original packet from virtual machine 120 and the source logical port associated with virtual machine 120. The second communication packet is then communicated, at step 3b, over network interface 140 to network interface 141 of host 111. Once received at the network interface, the communication is forwarded to hypervisor 131, at step 3c, wherein hypervisor 131 extracts, at step 4, the source logical port from the communication, and uses the source logical port to determine an applicable forwarding rule. If the packet is permitted to be transferred to virtual machine 125, then hypervisor 131 will forward, at step 5, the packet from virtual machine 120 to virtual machine 125.

In some implementations, hosts 110-111 are configured to maintain a data plane forwarding configuration for data packets as they are communicated over virtual switches. This data plane configuration may be based on received forwarding rules, wherein the rules may be supplied from a central controller or may be configured locally on each of the individual hosts. In some implementations, the forwarding rules may define source groups of virtual machines (such as database groups, application groups, front-end operation groups, and the like) for communications, destination groups of virtual machines for communications, and protocols for the communications, and associate the attributes with a forwarding action (forward, block, modify, etc.). In addition to the rules, hosts 110-111 may be configured to maintain logical port information for virtual machines within the virtual computing environment, wherein the logical port information identifies logical ports corresponding to virtual machines in the various virtual machine groups. For example, a forwarding rule may be defined that permits a group of application virtual machines to communicate with a group of database virtual machines. Once the rule is defined, the hosts may identify virtual machines and corresponding logical ports that qualify for the forwarding rule. Once the ports are identified, the data plane forwarding configuration may be updated to reflect which ports are associated with which forwarding rules.

Returning to the example in operational scenario 400, hypervisor 131 may extract the source port for virtual machine 120, determine a destination port for the communication (in this example the port for virtual machine 125), and identify a corresponding forwarding action for the communication based on the port information. In some examples, hypervisor 131 may further identify other attributes of the communication, such as the communication protocol, the time of communication, and other similar attributes in determining an action to be applied a packet. Once an action is identified, the packet may be forwarded based on the identified action. Thus, if an action directed the packet to be forwarded to virtual machine 125, the packet will be forwarded by hypervisor 131 to the virtual machine using the port associated with virtual machine 125. In contrast, if the packet is not permitted to be communicated directly to virtual machine 125, then hypervisor 131 may modify the packet and/or prevent the packet from being forwarded.

Although illustrated in the previous example with both the source and destination virtual machine belonging to the same logical network, it should be understood that not all data packets from the virtual machines may be sent to virtual machines on the same logical network. For example, if the first virtual machine were transferring a communication to a second virtual machine that is not on the same logical network, the MAC or IP address associated with the second virtual machine may be used in enforcing the forwarding rules. Accordingly, in addition to using the logical port information for virtual machines, in some examples, the data plane forwarding configuration may enforce rules using a combination of the logical port assignments (for virtual machines on the same logical network) and MAC or IP addresses for virtual machines not on the same logical network. These MAC or IP addresses may be provided from the central controller or exchanged between hosts in the virtual computing environment.

Similar to the operations for the transferring host computing system, the receiving host computing system may also employ a combination of the logical port identifiers (for virtual machines on the same logical network), and MAC or IP addresses for communications received from physical or virtual machines not on the logical network. For example, if host 111 received a communication directed at virtual machine 125 from a physical or virtual machine that is not on the same logical network as virtual machine 125, then host 111 may use the IP or MAC address associated with the source machine to apply the required forwarding rules. In some implementations, host 111 may process the packet to determine if a logical port identifier is located in the received packet, and if one is not included, use the IP or MAC address of the communicating device in determining a forwarding action.

In some implementations, in addition to applying the forwarding rules at the destination host, it should be understood that the forwarding rules may also be applied by host 110 in transferring the packet. In particular, host 110 may identify a destination logical port associated with virtual machine 125, determine an applicable forwarding action based on the ports of the communication, and apply the action to the data packet. Thus, if the packet were approved to be forwarded, then host 110 may forward the communication over the network to host 111. In contrast, if the communication were not permitted, the communication may be blocked from being transferred to host 111.

Figure 5:
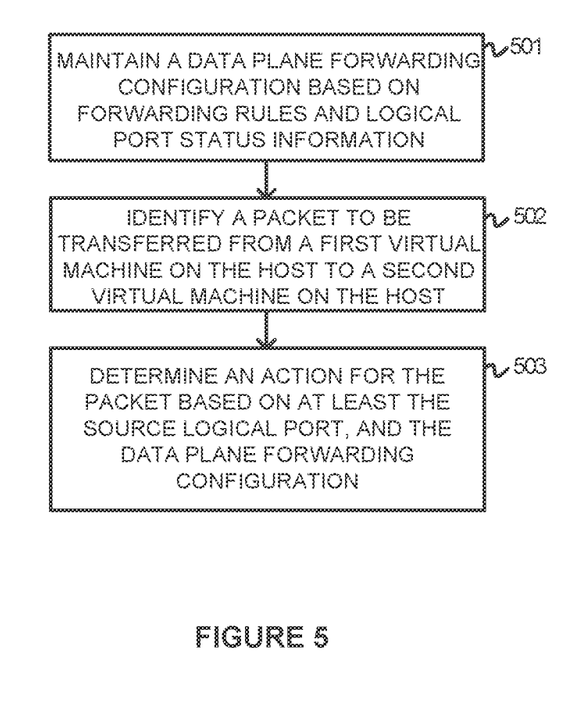
FIG. 5 illustrates an operation of a host to transfer a data packet from a first virtual machine to a second virtual machine according to an implementation.

FIG. 5 illustrates an operation 500 of a host to transfer a data packet from a first virtual machine to a second virtual machine according to an implementation. Operation 500 is described parenthetically in the paragraphs that follow with reference to systems and elements of virtual computing environment 100 of FIG. 1. In particular, operation 500 is described with reference to a packet being transferred between virtual machines using a single virtual switch on host 110 of FIG. 1.

Similar to operations described herein in FIGS. 1-4, a host computing system may be configured to maintain (501) a data plane forwarding configuration for the virtual machines based on forwarding rules and logical port status information. This data plane forwarding configuration is used to associate source and destination logical ports of a communication with forwarding actions for the communication. In some implementations, to define the data plane forwarding configuration, forwarding rules may be provided by an administrator either locally at the host or via an external controller, and may be implemented in the data plane by identifying logical ports that correspond to the administrator defined virtual machine groups. As the configuration is maintained, host 110 and hypervisor 130 may identify (502) a packet to be transferred from a first virtual machine on host 110 to a second virtual machine on host 110. In response to identifying the packet, host 110 may determine (503) an action for the packet based at least on the source logical port, and the data plane forwarding configuration. In some implementations to determine the action, host 110 may identify a source logical port associated with the communication, and a destination logical port for the communication. Once the ports are identified (along with any supplemental attributes for the communication), a forwarding action may be identified, and the action taken on the packet. This action may include forwarding the packet to the destination virtual machine, blocking the packet, modifying the packet, or some other similar action.

Figure 6:
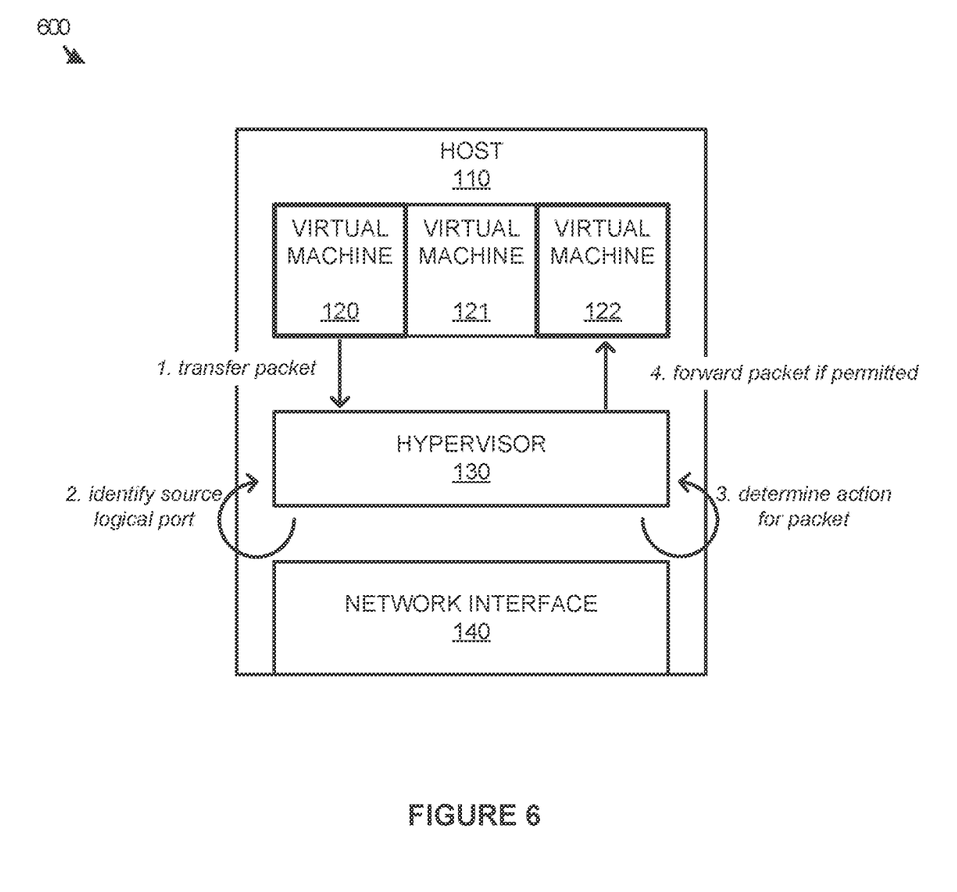
FIG. 6 illustrates an operational scenario of transferring a data packet from a first virtual machine to a second virtual machine according to an implementation.

FIG. 6 illustrates an operational scenario 600 of transferring a data packet from a virtual machine to a second virtual machine according to an implementation. Operational scenario 600 includes host 110 from virtual computing environment 100 of FIG. 1. Operational scenario 600 is an example communication over a single virtual switch.

In operation, virtual machine 120 transfers, at step 1, a packet to virtual machine 122 on host 110. In response to the packet being transferred by virtual machine 120, hypervisor 130 identifies, at step 2, a source logical port for virtual machine 120 and determines, at step 3, an action for the packet based at least in part on the source logical port. Once the action is identified and if the packet is permitted to be transferred to virtual machine 122, hypervisor 130 may forward the packet to virtual machine 122. Here, because the packet is transferred locally on a virtual switch of host 110, the packet is not required to be encapsulated into a second tunneling data packet. Instead, hypervisor 130 may directly apply and enforce the rules as both the source and destination logical ports are known to the hypervisor.

Figure 7:
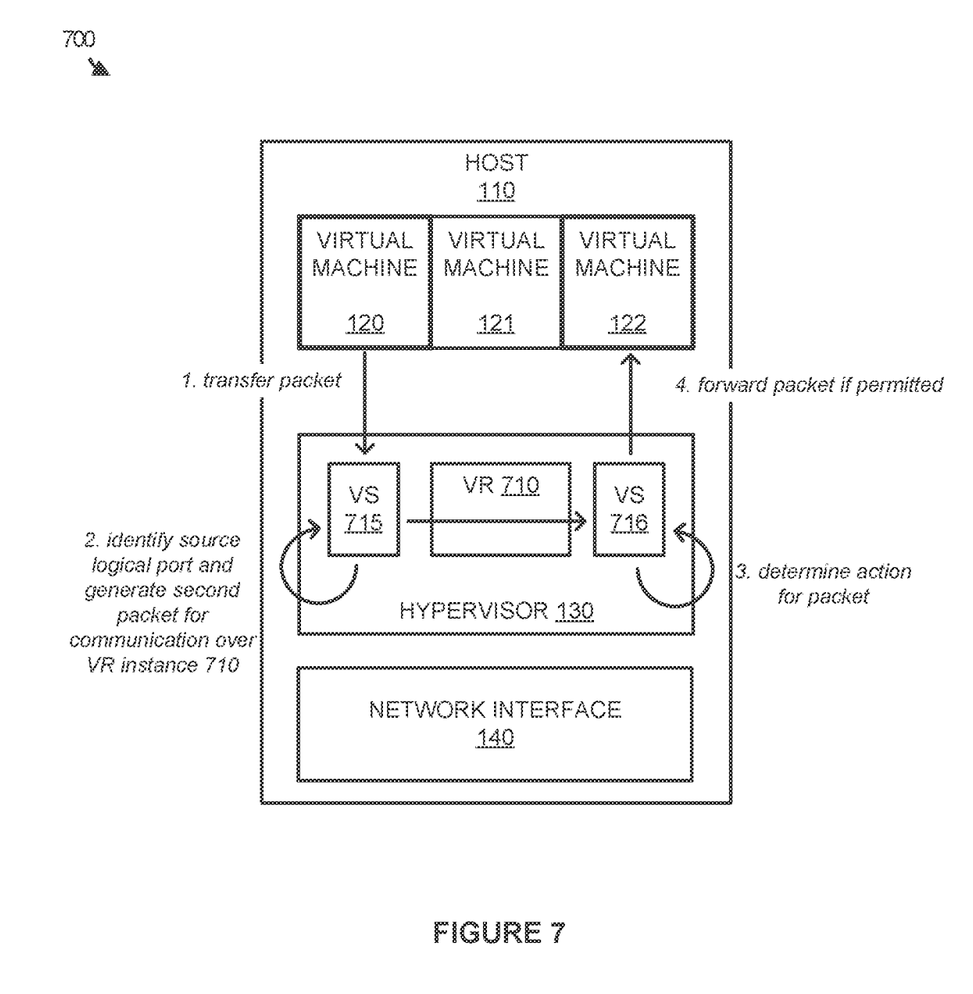
FIG. 7 illustrates an operational scenario of transferring a data packet from a first virtual machine to a second virtual machine according to an implementation.

FIG. 7 illustrates an operational scenario 700 of transferring a data packet from a first virtual machine to a second virtual machine according to an implementation. Operational scenario 700 includes systems and elements from virtual computing environment 100 of FIG. 1. In particular, operational scenario 700 includes elements of host 110 and further includes virtual switches (VS) 715-716 and a virtual router (VR) instance 710 provided via hypervisor 130.

In the example of FIG. 7, similar to the operations described in FIG. 6, virtual machine transfers, at step 1, a packet to be delivered to virtual machine 122. In response to identifying the packet to be transferred, virtual switch 715 of hypervisor 130 identifies, at step 2, a source logical port associated with virtual machine 120 and generates a second packet, wherein the second packet encapsulates the packet from virtual machine 120 with the logical port identifier for virtual machine 120. Once encapsulated, the packet is transferred over virtual router instance 710 for delivery to virtual machine 122. For example, virtual router instance 710 may be implemented by hypervisor 130 to logically separate virtual machines that are on the same host computing system, and provide the virtual machines with separate local area networks. Accordingly, virtual machine 120 may be located on first network provided by hypervisor 130, while virtual machine 122 is located on a second network provided by hypervisor 130. To provide the communication between the networks, virtual router instance 710 may be provided to couple the two networks.

Once the packet has been transferred over virtual router instance 710, hypervisor 130 may extract the source logical port from the header of the communication, and apply the forwarding rules to determine, at step 3, an action to be applied to the packet. If the packet is permitted based on at least the source logical port, hypervisor 130 may forward, at step 4, the packet to virtual machine 122. However, if the packet is not permitted, then the packet may be blocked by hypervisor 130 and not forwarded to virtual machine 122.

In some implementations, the virtual router or the hypervisor where the virtual router is executing may additionally forward the incoming source logical port toward the destination virtual machine so that the destination hypervisor can compute the forwarding action based on the source port. For example, rather than communicating the packet locally on host 110, as illustrated in FIG. 7, the packet may be transferred to virtual router 710 before being transferred over a physical network to a second host computing system. Accordingly, virtual router 710 or hypervisor 130 may be responsible for providing the source address to the second computing system, permitting the second host computing system to determine an action for the packet based on the source address. Additionally, the virtual router may also install its logical port identifier into the tunnel headers for the communication, which may be used for delivering services such as packet path information. Thus, in addition to the logical port associated with the source virtual machine, the virtual router may add its own logical port to provide packet path information to the destination virtual switch, hypervisor, and/or virtual machine.

Figure 8:
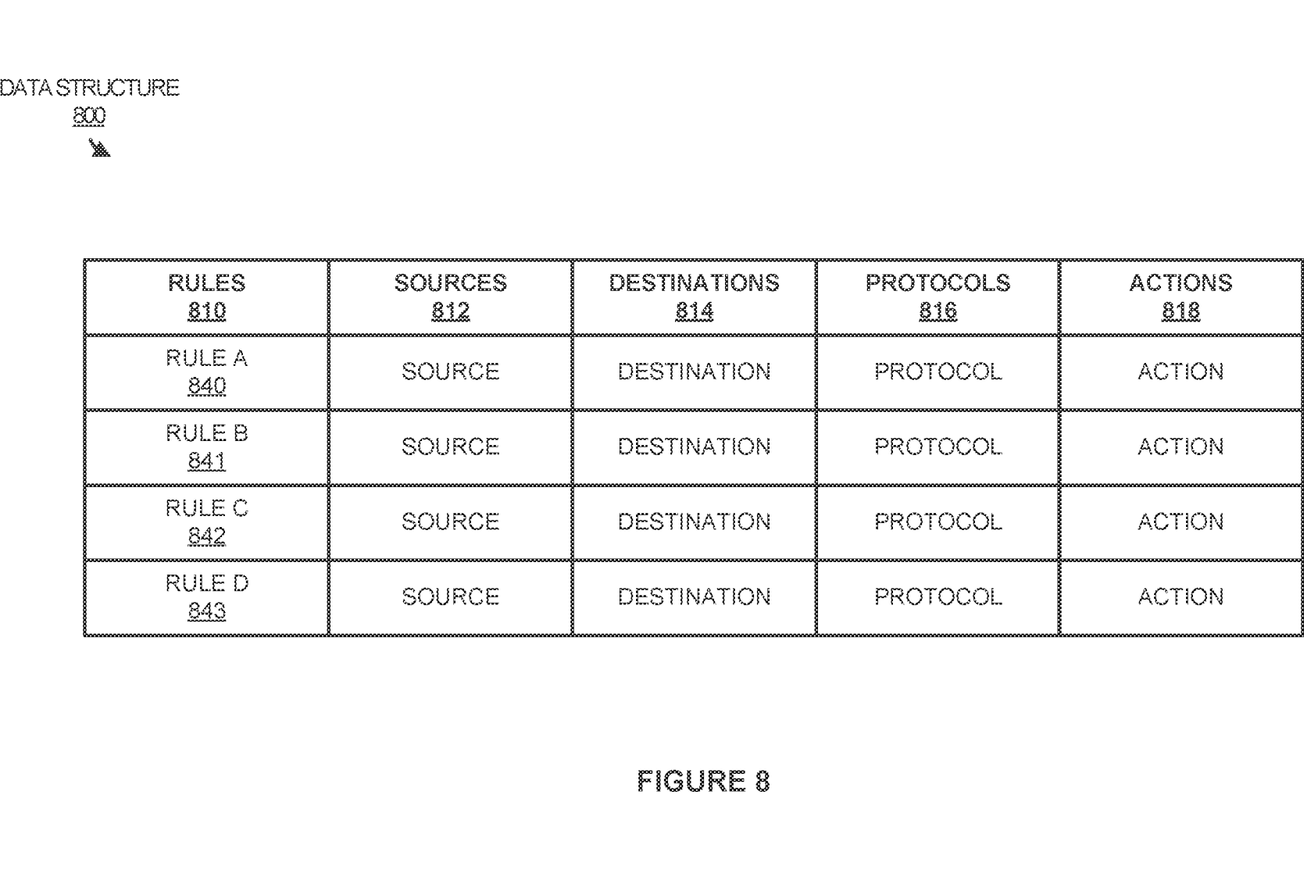
FIG. 8 illustrates a rule data structure according to an implementation.

FIG. 8 illustrates a rule data structure 800 according to an implementation. Rule data structure 800 is representative of a format for providing rules to virtual switches in a computing environment. These rules may be defined locally at the host, or may be provided via a central controller for a plurality of hosts. In the particular example, rule data structure 800 includes columns for rules 810, sources 812, destinations 814, protocols 816, and actions 818. Although illustrated as a single table in the present example, it should be understood that one or more tables, linked lists, arrays, data trees, or other similar data structures may be used in defining the forwarding rules for a SDN.

During operation of a virtual computing environment, administrators may define forwarding rules to be implemented within the computing network. These forwarding rules define attributes of packets that, when encountered, assert forwarding actions on the packets, such as actions to forward the packet toward its destination, block the packet, modify the packet, or some other similar action on the packet. In some implementations, the packet rules may define attributes in the form of virtual machine groups or security groups, wherein as virtual machines are added to the groups they are each assigned forwarding rules in accordance with the groups. For example, referring to the example of data structure 800, when rule A 840 is defined for virtual machines of a virtual computing environment, the administrator may define a source, a destination, and a protocol, and may further define an action when those attributes are identified. Thus, an administrator may define a rule that permits an application group of virtual machines to communicate with database virtual machines using a database protocol.

Once the rules are generated and provided to the host computing systems, the hypervisor may translate the rules based on logical ports assigned to virtual machines within the computing network. In particular, the hypervisor may maintain logical port status information for the various virtual machines in the environment. Accordingly, referring to the example of the application group and the database group, the hypervisor may identify logical ports associated with the application group and the database group. Once identified, the data plane for the virtual switches coupled to the virtual machines may be configured to implement the rules using the logical ports.

Although illustrated in the example of FIG. 8 as including four rules 840-843, it should be understood that any number of rules may be implemented in a virtual computing environment. These rules may be used to separate communications between computing groups, manage inbound network communications from systems outside of the virtual computing environment, or provide any other SDN management for virtual machines within the network.

Figure 9:
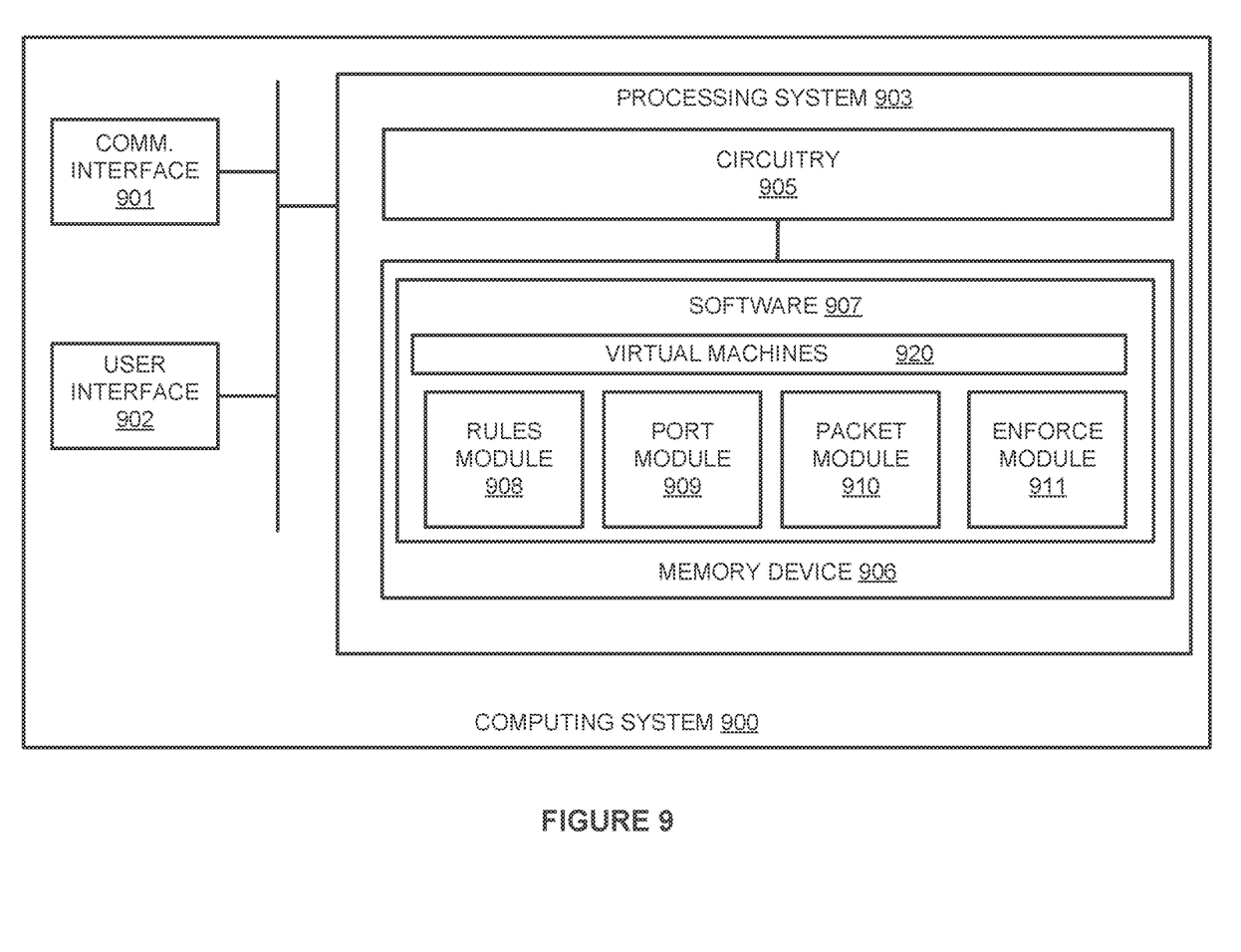
FIG. 9 illustrates a host computing system to manage packet forwarding based on port identifiers according to an implementation.

FIG. 9 illustrates a computing system 900 to prioritize processing of network packets according to an implementation. Computing system 900 is representative of any computing system or systems with which the various operational architectures, processes, scenarios, and sequences disclosed herein for a host system can be implemented. Computing system 900 is an example of hosts 110-111, although other examples may exist. Computing system 900 comprises communication interface 901, user interface 902, and processing system 903. Processing system 903 is linked to communication interface 901 and user interface 902. Processing system 903 includes processing circuitry 905 and memory device 906 that stores operating software 907. Computing system 900 may include other well-known components such as a battery and enclosure that are not shown for clarity.

Communication interface 901 comprises components that communicate over communication links, such as network cards, ports, radio frequency (RF), processing circuitry and software, or some other communication devices. Communication interface 901 may be configured to communicate over metallic, wireless, or optical links. Communication interface 901 may be configured to use Time Division Multiplex (TDM), Internet Protocol (IP), Ethernet, optical networking, wireless protocols, communication signaling, or some other communication format—including combinations thereof. In at least one implementation, communication interface 901 may be used to communicate with one or more other computing systems that together provide operations for a SDN, including other hosts and/or a central controller that defines network rules for the SDN.

User interface 902 comprises components that interact with a user to receive user inputs and to present media and/or information. User interface 902 may include a speaker, microphone, buttons, lights, display screen, touch screen, touch pad, scroll wheel, communication port, or some other user input/output apparatus—including combinations thereof. User interface 902 may be omitted in some examples.

Processing circuitry 905 comprises microprocessor and other circuitry that retrieves and executes operating software 907 from memory device 906. Memory device 906 may include volatile and nonvolatile, removable and non-removable media implemented in any method or technology for storage of information, such as computer readable instructions, data structures, program modules, or other data. Memory device 906 may be implemented as a single storage device, but may also be implemented across multiple storage devices or sub-systems. Memory device 906 may comprise additional elements, such as a controller to read operating software 907. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 905 is typically mounted on a circuit board that may also hold memory device 906 and portions of communication interface 901 and user interface 902. Operating software 907 comprises computer programs, firmware, or some other form of machine-readable program instructions. Operating software 907 includes rules module 908, port module 909, packet module 910, and enforce module 911, although any number of software modules may provide a similar operation. Modules 907-911 may operate as part of a hypervisor for virtual machines 920 in some implementations. Operating software 907 may further include an operating system, utilities, drivers, network interfaces, applications, or some other type of software. When executed by processing circuitry 905, operating software 907 directs processing system 903 to operate computing system 900 as described herein.

In operation, virtual machines 920 may execute on computing system 900 to provide desired processes and more efficiently use the physical resources provided by computing system 900. To provide connectivity to the virtual machines, a hypervisor may implement a SDN, which provides logical routers and switches to connect the virtual machines to other real and virtual computing systems. Here, rules module 908 directs processing system 903 to maintain a data plane forwarding configuration based on forwarding rules and logical port status information for virtual machines of a virtual computing environment. This data plane may be configured based on rules provided either locally via user interface 902, or externally via a second computing system, such as a central SDN controller. These rules may be defined using groups, such as security groups, which are used to maintain security parameters for one or more virtual machines. For example, a rule may define a group "database services" that then ensures that all virtual machines that provide the service receive the same rules. Accordingly, in addition to using the rules to maintain the data plane, rules module 908 may direct processing system 903 to identify ports of virtual machines in the virtual computing environment. These ports may then be used to translate the rules into individual data plane forwarding actions for each of the virtual machines. For example, if four virtual machines qualified for a security group, then the logical ports for the virtual machines may be used in configuring the forwarding actions.

While maintaining the data plane forwarding configuration, port module 909 directs processing system 903 to identify a packet to be transferred from a first virtual machine to a second virtual machine, wherein the second virtual machine may reside on a separate virtual switch coupled via at least one virtual router, or may comprise a second virtual machine operating on a second physical host computing system. In response to the request, port module 909 directs processing system 903 to identify at least a source logical port associated with the communicating virtual machine. Once the logical port is identified, packet module 910 directs processing system 903 to encapsulate the packet from the virtual machine with the source logical port into a second packet. This second packet may be used for the transmission between physical machines or communications over virtual routers in some implementations, and may comprise a VXLAN packet, a GENEVE packet, or some other similar packet.

In some implementations, in addition to generating the packet for transfer, enforce module 911 may direct processing system 903 to enforce forwarding rules prior to the transfer of the packet. To provide this operation, enforce module 911 may identify a source logical port for the communication, a destination logical port of the communication, and in some implementations protocol information for the packet, and determine whether the packet is capable of transmission. If the packet is not capable of transmission, then enforce module 911 may prevent the packet from being provided to the destination virtual switch by preventing the transfer of the second packet. In contrast, if the packet is permitted, then enforce module 911 may permit the generation of the second packet and the second packet may be forwarded to the corresponding host or over a virtual router.

In addition to the transmission of packets, enforce module 911 may be used when a packet is received by a virtual switch for a virtual machine. In particular, enforce module 911 may receive a tunneling packet transmitted from a second host or over a virtual router, wherein the tunneling packet may include a data packet for destination virtual machine and a source logical port associated with the source virtual machine for the data packet. Once received, enforce module 911 may extract a source logical port from the tunneling packet, and after extraction, the source logical port may be used to determine whether the communication is permitted. In some implementations, enforce module 911 may use at least the source logical port extracted from the header, the destination logical port associated with the destination virtual machine to determine whether the packet is to be forwarded. If it is permitted, then the data packet may be forwarded to the corresponding destination virtual machine. In contrast, if the communication is not permitted, then the communication may be blocked and prevented from being forwarded to the destination virtual machine.

Returning to the elements of FIG. 1, hosts 110-111 and central controller 150 may each comprise communication interfaces, network interfaces, processing systems, computer systems, microprocessors, storage systems, storage media, or some other processing devices or software systems, and can be distributed among multiple devices. Hosts 110-111 and central controller 150 can each include software such as an operating system, logs, databases, utilities, drivers, natural language processing software, networking software, and other software stored on a computer-readable medium. Hosts 110-111 and central controller 150 may each comprise a serving computing system, a desktop computing system, or some other similar computing system.

Communication between hosts 110-111 and central controller 150 may use metal, glass, optical, air, space, or some other material as the transport media. Communication between hosts 110-111 and central controller 150 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between hosts 110-111 and central controller 150 may be a direct link or can include intermediate networks, systems, or devices, and can include a logical network link transported over multiple physical links.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a first host, the method comprising:
   receiving a communication from a second host, wherein the communication comprises a packet that encapsulates a second packet in a payload for the packet and includes a source logical port identifier in a header for the packet, the source logical port identifier uniquely identifying a source logical port for a sending virtual machine of the second packet, the source logical port corresponding to a logical network link between a virtual switch on the second host and the sending virtual machine;
   decapsulating the second packet from the packet; and
   determining a forwarding action for the second packet based at least on the source logical port identifier and a data plane forwarding configuration.

2. The method of claim 1, wherein determining the forwarding action for the second packet based at least on the source logical port and the data plane forwarding configuration comprises determining the forwarding action for the second packet based at least on the source logical port identifier, a destination logical port identifier for the virtual machine executing on the first host, and the data plane forwarding configuration.

3. The method of claim 1, wherein the second packet comprises a transmission control protocol packet or a user datagram protocol packet.

4. The method of claim 1, wherein the forwarding action comprises one of a block or a permit action.

5. The method of claim 1, wherein the packet comprises a tunneling protocol packet.

6. The method of claim 5, wherein the tunneling protocol comprises Generic Network Virtualization Encapsulation (GENEVE) protocol.

7. The method of claim 1 further comprising:
   maintaining the data plane forwarding configuration based on forwarding rules and logical port status information associated with virtual machines.

8. A computing apparatus comprising:
   a storage system;
   a processing system operatively coupled to a storage system; and
   program instructions stored on the storage system to operate a first host that, when executed by the processing system, direct the computing apparatus to:
      receive a communication from a second host, wherein the communication comprises a packet that encapsulates a second packet in a payload for the packet and includes a source logical port identifier in a header for the packet, the source logical port identifier uniquely identifying a source logical port for a sending virtual machine of the second packet, the source logical port corresponding to a logical network link between a virtual switch on the second host and the sending virtual machine;

decapsulate the second packet from the packet; and determine a forwarding action for the second packet based at least on the source logical port identifier and a data plane forwarding configuration.

9. The computing apparatus of claim 8, wherein determining the forwarding action for the second packet based at least on the source logical port and the data plane forwarding configuration comprises determining the forwarding action for the second packet based at least on the source logical port identifier, a destination logical port identifier for the virtual machine executing on the first host, and the data plane forwarding configuration.

10. The computing apparatus of claim 8, wherein the second packet comprises a transmission control protocol packet or a user datagram protocol packet.

11. The computing apparatus of claim 8, wherein the forwarding action comprises one of a block or a permit action.

12. The computing apparatus of claim 8, wherein the packet comprises a tunneling protocol packet.

13. The computing apparatus of claim 12, wherein the tunneling protocol comprises Generic Network Virtualization Encapsulation (GENEVE) protocol.

14. The computing apparatus of claim 8, wherein the program instructions further direct the computing apparatus to:

maintain the data plane forwarding configuration based on forwarding rules and logical port status information associated with virtual machines.

15. A system comprising:
a first host; and
a second host configured to:
receive a communication from the first host, wherein the communication comprises a packet that encapsulates a second packet in a payload for the packet and includes a source logical port identifier in a header for the packet, the source logical port identifier uniquely identifying a source logical port for a sending virtual machine of the second packet, the source logical port corresponding to a logical network link between a virtual switch on the first host and the sending virtual machine;

decapsulate the second packet from the packet; and determine a forwarding action for the second packet based at least on the source logical port identifier and a data plane forwarding configuration.

16. The system of claim 15, wherein determining the forwarding action for the second packet based at least on the source logical port and the data plane forwarding configuration comprises determining the forwarding action for the second packet based at least on the source logical port identifier, a destination logical port identifier for the virtual machine executing on the second host, and the data plane forwarding configuration.

17. The system of claim 15, wherein the second packet comprises a transmission control protocol packet or a user datagram protocol packet.

18. The system of claim 15, wherein the forwarding action comprises one of a block or a permit action.

19. The system of claim 15, wherein the packet comprises a tunneling protocol packet.

20. The system of claim 19, wherein the tunneling protocol comprises Generic Network Virtualization Encapsulation (GENEVE) protocol.

* * * * *